US010609144B2

(12) United States Patent
Dasari et al.

(10) Patent No.: US 10,609,144 B2
(45) Date of Patent: Mar. 31, 2020

(54) CREATING A STORAGE AREA NETWORK ZONE BASED ON A SERVICE LEVEL AGREEMENT

(71) Applicant: HEWLETT PACKARD ENTERPRISE DEVELOPMENT LP, Houston, TX (US)

(72) Inventors: Rajashekar Dasari, Bangalore (IN); Thavamaniraja Sakthivel, Bangalore (IN); Sudheer Yetukuri, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 57 days.

(21) Appl. No.: 15/877,908

(22) Filed: Jan. 23, 2018

(65) Prior Publication Data
US 2018/0219947 A1 Aug. 2, 2018

(30) Foreign Application Priority Data
Jan. 30, 2017 (IN) .............................. 201741003418

(51) Int. Cl.
*H04L 29/08* (2006.01)
*H04L 12/851* (2013.01)
*H04L 12/24* (2006.01)

(52) U.S. Cl.
CPC ...... *H04L 67/1097* (2013.01); *H04L 41/0893* (2013.01); *H04L 41/12* (2013.01);
(Continued)

(58) Field of Classification Search
CPC ... G06F 3/067; G06F 3/0631; H04L 67/1097; H04L 67/10; H04L 41/5003;
(Continued)

(56) References Cited

U.S. PATENT DOCUMENTS 7,437,753 B2  10/2008  Nahum
7,886,031 B1  2/2011  Taylor et al.
(Continued)

OTHER PUBLICATIONS

Cisco, "Managing SAN Zones and SAN Zonesets," (Research Paper), 2014, 8 pages, http://www.cisco.com/c/en/us/td/docs/unified_computing/ucs/ucs-director/network-devices-mgmtguide/6-0b_Network_Devices_Management_Guide_60b_Network_Devices_Management_Guide_60_chapter_010111.pdf.
(Continued)

*Primary Examiner* — Chirag R Patel
(74) *Attorney, Agent, or Firm* — Hewlett Packard Enterprise Patent Department (57) ABSTRACT

Examples disclosed herein relate to creation of a storage area network (SAN) zone based on a service level agreement (SLA). In an example, provisioning of a server in a cloud may be determined. Further, a Service Level Agreement (SLA) for the provisioned server may be determined. The SLA may define desired states of SAN configuration parameters to be met in configuring a SAN zone for the provisioned server. Network components and storage components in the cloud that meet the desired states of SAN configuration parameters defined in the SLA may be identified. A SAN zone for the provisioned server may be created based on the identified network components and storage components.

14 Claims, 4 Drawing Sheets

(52) U.S. Cl.
   CPC ...... *H04L 41/5003* (2013.01); *H04L 47/2425* (2013.01); *H04L 67/16* (2013.01); *H04L 41/5096* (2013.01)

(58) Field of Classification Search
   CPC ............. H04L 47/2425; H04L 41/5009; H04L 41/0893; H04L 41/12; H04L 41/5096; H04L 67/16
   See application file for complete search history.

(56) References Cited

U.S. PATENT DOCUMENTS

| | | |
|---|---|---|
| 7,996,509 B2 | 8/2011 | Basham et al. |
| 8,930,537 B2 | 1/2015 | Basham et al. |
| 2005/0091353 A1 | 4/2005 | Gopisetty et al. |
| 2007/0067589 A1 | 3/2007 | Mishra et al. |
| 2008/0162681 A1* | 7/2008 | Yellapragada ...... H04L 41/0806 709/223 |
| 2008/0256323 A1 | 10/2008 | Mopur et al. |
| 2009/0013213 A1 | 1/2009 | Kalman et al. |
| 2016/0110431 A1 | 4/2016 | Osias |
| 2017/0315838 A1* | 11/2017 | Nidugala .............. G06F 9/5088 |

OTHER PUBLICATIONS

"Brocade SAN Health", available online at https://web.archive.org/web/20180111031645/http://www.brocade.com/en/support/support-tools/brocade-san-health.html, Jan. 11, 2018, 2 pages.

* cited by examiner

CREATING A STORAGE AREA NETWORK ZONE BASED ON A SERVICE LEVEL AGREEMENT

BACKGROUND

A data center may centralize and consolidate Information Technology (IT) resources thereby enabling organizations to conduct business round-the-clock. A data center infrastructure may include a collection of heterogeneous resources (for example, storage devices, network components, etc.).

BRIEF DESCRIPTION OF THE DRAWINGS

For a better understanding of the solution, embodiments will now be described, purely by way of example, with reference to the accompanying drawings, in which.

DETAILED DESCRIPTION

A typical data center infrastructure may include a variety of components (both hardware and/or software). These components may include, for example, servers, networking equipment (for example, routers and switches), storage, and security (for example, firewall). Further, there are a variety of new computing options such as cloud systems and virtual servers. Such advancements have helped organizations quickly scale-up their existing IT infrastructures according to their requirements. However, it has also made the task of IT personnel who manage various components (for example, storage device) in those infrastructures more difficult. For example, a Storage Area Network (SAN) administrator may try to design a secure and performance-driven SAN environment across a data center through SAN zoning.

The basic premise of SAN zoning is to control who can see what in a SAN. To build a SAN zone, an administrator may consider information related to network fabric, switch ports, target ports, initiator ports, SAN fabric usage pattern, target storage system, target port availability, customer Service Level Agreement (SLA), zone design pattern, etc. Without this information, a SAN administrator may find it difficult to achieve a SLA.

Some approaches to SAN zoning include creating a SAN zone based on free port availability in the fabric along with a randomly selected target storage system based on previous knowledge of a SAN administrator. Needless to say, in a data center or cloud environment that may include hundreds of network and storage components, it is not desirable to design a SAN zone in this manner.

To address these technical challenges, the present disclosure describes various examples for creating a storage area network (SAN) zone based on a service level agreement (SLA). In an example, provisioning of a server in a cloud may be determined. Further to the determination, a Service Level Agreement (SLA) for the provisioned server may be determined. The SLA may define desired states of SAN configuration parameters to be met in configuring a SAN zone for the provisioned server. Based on the SLA, components may be identified in the cloud for creating a SAN zone for the provisioned server. In an example, the components may include network components and storage components in the cloud that meet the desired states of SAN configuration parameters defined in the SLA. Further to the identification, a SAN zone for the provisioned server may be created based on the identified network components and storage components.

Figure 1:
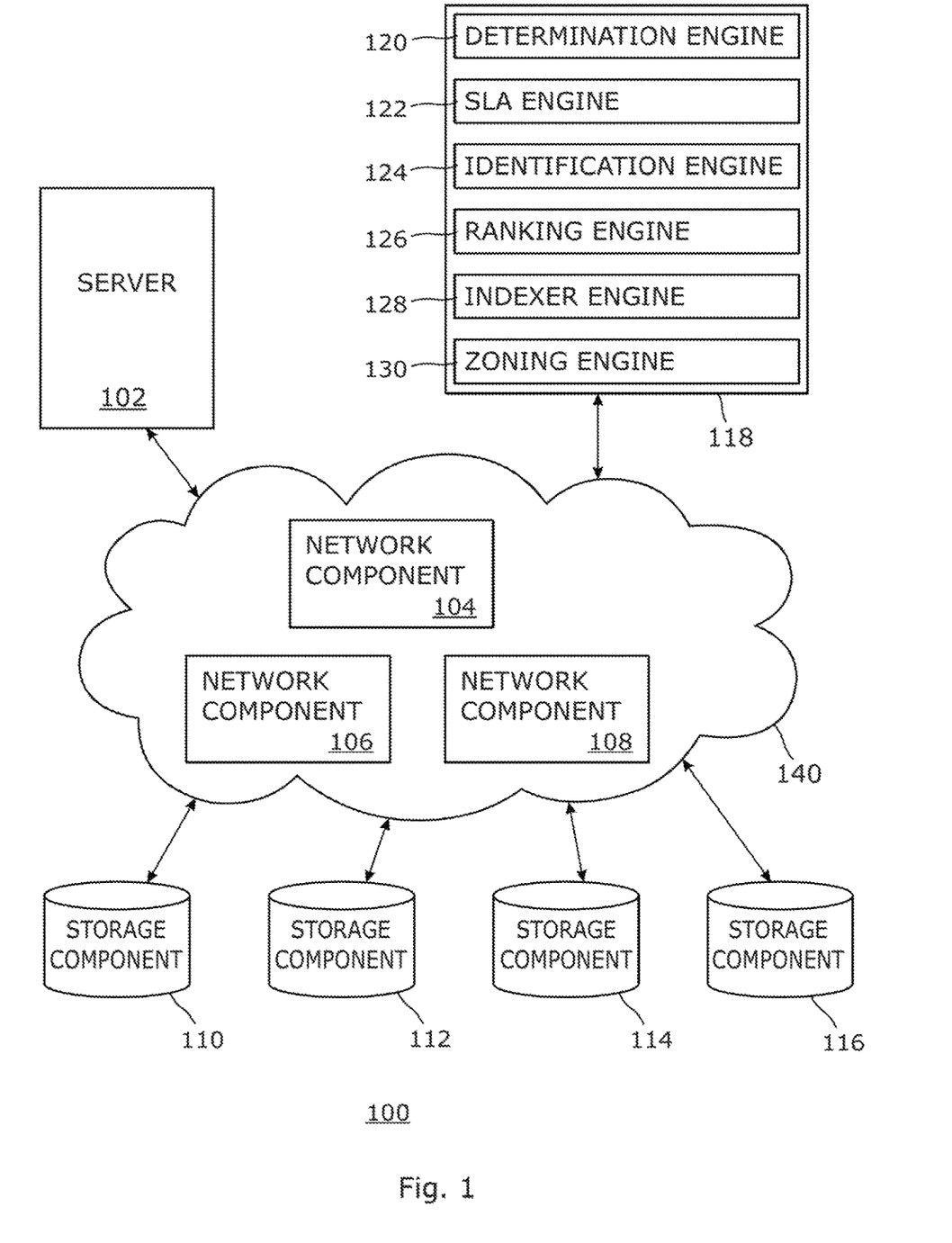
FIG. 1 is a block diagram of an example computing environment for creating a storage area network (SAN) zone based on a service level agreement (SLA)

FIG. 1 is a block diagram of an example computing environment 100 for creating a storage area network (SAN) zone based on a service level agreement (SLA). In an example, computing environment 100 may include a server 102, network components 104, 106, and 108, and storage components 110, 112, 114, and 116, and a computing system 118. Although one server, three network components, and four storage components are shown in FIG. 1, other examples of this disclosure may include more than one server, more or less than three network components, and more or less than four storage components.

As used herein, the term "server" may include a computer and/or a computer program (machine-readable instructions) that may process requests from other (client) computers over a network.

Network components 104, 106, and 108 may each be a network device, a network software, or any combination thereof. As used herein, a "network device" may refer to any type of networking device that may be capable of routing packets. In examples, a network device may include a network switching device, such as a network switch, a network router, a virtual switch, or a virtual router. Some non-limiting examples of the network software may include Transmission Control Protocol (TCP), User Datagram Protocol (UDP), and OpenSwitch Linux Network Operating System.

Storage components 110, 112, 114, and 116 may each be a storage device, a storage software, or any combination thereof. The storage device may be an internal storage device, an external storage device, or a network attached storage device. Other examples of the storage device may include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, the storage device may be a Direct Attached Storage (DAS) device, a Network Attached Storage (NAS) device, a Redundant Array of Inexpensive Disks (RAID), a data archival storage system, or a block-based device over a storage area network (SAN). In one example, the storage device may be a storage array, which may include one or more storage drives (for example, hard disk drives, solid state drives, etc.)

In an example, network components 104, 106, and 108 may represent a network fabric 140. As used herein, the term "network fabric" may refer to a network topology in which components may exchange data with each other through interconnecting network devices. Server 102 may be communicatively coupled to storage components 110, 112, 114, and 116 via the network fabric. In an example, network fabric 140 may represent a Storage Area Network (SAN). The SAN may provide block-level storage that may be accessed by an application running on a server (for example, 102). The SAN may consolidate storage provided by storage components in a manner that a server (for example, 102) in the SAN may access shared storage as if it is directly attached to the server. In an example, physical storage space provided by storage components in the SAN may be presented as a logical storage space to a host device (for example, 102). Such logical storage space may be identified using a "Logical Unit Number" (LUN). LUNs may be used to identify individual or collections of physical disk devices for address by a protocol associated with a SCSI, iSCSI, Fibre Channel (FC), and the like.

Some example communication protocols that may be used by server 102 to communicate with storage components 110, 112, 114, and 116 network fabric 140 may include Fibre Channel (FC), Ethernet, Internet Small Computer System Interface (iSCSI), HyperSCSI, ATA over Ethernet (AoE), and Fibre Channel over Ethernet (FCoE).

In an example, computing environment 100 may represent a cloud computing environment (or "cloud"), and server 102, network components 104, 106, and 108, and storage components 110, 112, 114, and 116 may be referred to as cloud resources. Cloud computing environment 100 may represent a public cloud, a private cloud, a community cloud, or a hybrid cloud. Cloud computing environment 100 may be used to provide or deploy various types of cloud services. These may include Infrastructure as a Service (IaaS), Platform as a Service (PaaS), Software as a Service (SaaS), and so forth. In an example, the cloud computing environment may include a cloud platform.

As used herein, a "cloud platform" may refer to a tool (software and/or hardware) which may be used to manage resources in a cloud computing environment. In an example, the cloud platform may be used to manage server 102, network components 104, 106, and 108, and storage components 110, 112, 114, and 116. In an example, the aforementioned components may be used by the cloud platform to provide a cloud service (for example, IaaS) to a user. A non-limiting example of the cloud platform may include OpenStack. In another example, computing environment 100 may represent a SAN.

Computing system 118 may represent any type of computing device capable of reading machine-executable instructions. Examples of the computing device may include, without limitation, a server, a desktop computer, a notebook computer, a tablet computer, a thin client, a mobile device, a personal digital assistant (PDA), a phablet, and the like. Computing system 118 may be in communication with computing environment, for example, via a computer network. In an instance, the network may be a Local Area Network (LAN), a Wireless Local Area Network (WAN), a Metropolitan Area Network (MAN), a public network (for example, the Internet) or a private network (for example, an intranet).

In an example, computing system 118 may include a determination engine 120, a Service Level Agreement (SLA) engine 122, an identification engine 124, a ranking engine 126, an indexer engine 128, and a zoning engine 130.

Engines 120, 122, 124, 126, 128, and 130 may include any combination of hardware and programming to implement the functionalities of the engines described herein, but at least include hardware that is configured to perform the functionalities. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of the computing system 118. In some examples, the at least one machine-readable storage medium may store instructions that, when executed by the at least one processing resource, at least partially implement some or all engines of computing system 118. In such examples, the computing system 118 may include the at least one machine-readable storage medium storing the instructions and the at least one processing resource to execute the instructions.

Determination engine 120 may determine provisioning of a server (for example, 102) in computing environment 100. When a new server is included in computing environment 100, determination engine 120 may identify such inclusion. In an example, server 102 may be provisioned via platform, for example, a cloud or data center platform. In an example, determination engine 120 may be coupled to the platform. In an example, the provisioning may include a network fabric logon by server 102. This may enable server 102 to obtain its 24-bit address, which may be used for routing in network fabric 140. Determination engine 120 may determine unique World Wide Names (WWNs) in relation to server 120. Examples of WWNs may include a WWN for server, and respective WWNs for each port on server. The provisioning may include server 102 logging on to a name server service in SAN to register itself.

Service Level Agreement (SLA) engine 122 may determine a Service Level Agreement (SLA) associated with server. In an example, the SLA may be a file. In an example, server may store an associated SLA (or SLAs). In another example, the SLA (or SLAs) may be stored on a separate storage device, which may be communicatively coupled to, for example, server or another component of computing environment.

In an example, the SLA may define the desired states of SAN configuration parameters to be met in configuring a SAN zone for server. As used herein, SAN zoning may include allocation of resources in a SAN. Zoning may allow a logical separation of traffic between host (for example, server 102) and resources (for example, storage components 110, 112, 114, and 116). The premise of SAN zoning is to control who can see what in a SAN. By breaking up a SAN into zones, processing activity may distributed evenly across the network. SAN zoning groups together hosts and storage components that require communication. Nodes (for example, server and storage components) in a SAN can communicate if they are members of the same SAN zone.

SAN zoning may be performed in various ways. For example, in hard zoning, each device may be assigned to a particular zone, and this assignment does not change. In soft zoning, device assignments may be changed to accommodate variations in the demands on different servers in the network. In an example, SAN zoning may be performed by listing the members in a zone using their port IDs or 24-bit addresses. In another approach to SAN zoning, members in a zone may be listed using their WWNs.

In an example, a SLA associated with a server may include a rating. In an example, the rating may be based on the desired states of SAN configuration parameters defined in the SLA. In an example, a relatively higher rating to a SLA may represent that one or multiple SAN configuration parameters defined in the SLA is/are to be configured at or provide relatively higher capabilities (for example, performance-related) in comparison to a SLA with a lower rating. Table 1 illustrates example SLA ratings (Platinum, Gold, and Silver) along with corresponding configuration parameters. In the given example, configuration parameters (for example, IOPs) for the Platinum SLA are expected to be configured at relatively higher capabilities (for example, 300).

TABLE 1

| SLA rating | Disk Type | IOPs | Target Systems Available Capacity in TiB | High Availability (No. of Paths) | Fabric classification |
|---|---|---|---|---|---|
| Platinum | SSD | 300 | 50 | 64 | Director switch (core switch) |
| Gold | FC | 200 | 20 | 32 | Edge switch |
| Silver | SATA | 100 | 10 | 16 | Edge switch |

Examples of SAN configuration parameters to be met in configuring a SAN zone for server may include a disk drive type, available storage capacity in a storage component, storage array port WWN, storage component input/output operations per second (IOPs), port speed on a storage component, a network fabric coupled to a storage component, a network switching device coupled to a storage component, and a number of available paths to a storage component.

Identification engine 124 may identify components in computing environment 100 for creating a SAN zone for server 102. In an example, the identification may comprise identifying network components (for example, 104, 106, and 108) and/or storage components (for example, 110, 112, 114, and 116) in computing environment 100 that meet the desired states of SAN configuration parameters defined in the SLA for server 102. In an example, the identification may comprise first identifying all network components and/or storage components in computing environment along with parameters associated with those components. Examples of parameters associated with a network component may include a networking switching device, a type of networking switching device (for example, a core switch or an edge switch), a number of free ports on a networking switching device, port speed on a networking switching device, aggregated switch input/output operations per second (IOPs). Examples of parameters associated with a storage component may include a disk drive type, available storage capacity in a storage component, storage array port WWN, storage component input/output operations per second (IOPs), port speed on a storage component, a network fabric coupled to a storage component, and a network switching device coupled to a storage component.

In an example, a schema may be used to represent the current state of associated parameters in relation to a specific category of identified components. For example, a fabric schema may be used to represent the current state of associated parameters in relation to network components. An example fabric schema is given in Table 2 below.

TABLE 2

| Fabric | Switch | Switch Type | Ports Free | Port Speed | Aggregated Switch IOPs (Received + Transmitted) Mbytes/Sec |
|---|---|---|---|---|---|
| Fabric 1 | Switch 1 | Core | 35 | 8 | 1000 |
|  | Switch 2 | Edge | 35 | 8 | 1000 |
| Fabric 2 | Switch 1 | Core | 20 | 16 | 500 |
|  | Switch 2 | Edge | 20 | 16 | 500 |
| Fabric 3 | Switch 1 | Core | 25 | 32 | 250 |
|  | Switch 2 | Edge | 25 | 32 | 250 |

Likewise, a storage schema may be used to represent the current state of associated parameters in relation to storage components. An example, storage schema is given in Table 3 below.

TABLE 3

| Storage Array | Disk Type | Available Capacity in TB | Storage System Port WWN | Storage System Port Speed | Connected Switch | Connected Fabric |
|---|---|---|---|---|---|---|
| Array A | SSD | 2 | 20:01:00:02:ac:00:10: b5 | 24 | Switch 1 | Fabric 1 |
|  |  |  | 20:01:00:02:ac:00:10: b6 | 24 | Switch 2 | Fabric 1 |
|  |  |  | 20:01:00:02:ac:00:10: b7 | 24 | Switch 1 | Fabric 3 |
|  |  |  | 20:01:00:02:ac:00:10: b8 | 24 | Switch 2 | Fabric 3 |
| Array B | FC | 2 | 50:06:01:6f:3e:a0:4c: 9c | 16 | Switch 1 | Fabric 1 |
|  |  |  | 50:06:01:6f:3e:a0:4c: 9d | 16 | Switch 2 | Fabric 1 |
|  |  |  | 50:06:01:6f:3e:a0:4c: 9e | 16 | Switch 1 | Fabric 3 |
|  |  |  | 50:06:01:6f:3e:a0:4c: 9f | 16 | Switch 2 | Fabric 3 |
| Array C | SSD | 1 | 50:00:09:75:f0:14:c9: c2 | 32 | Switch 1 | Fabric 1 |
|  |  |  | 50:00:09:75:f0:14:c9: c3 | 32 | Switch 2 | Fabric 1 |
|  |  |  | 50:00:09:75:f0:14:c9: c4 | 32 | Switch 1 | Fabric 2 |
|  |  |  | 50:00:09:75:f0:14:c9: c5 | 32 | Switch 2 | Fabric 2 |

TABLE 3-continued

| Storage Array | Disk Type | Available Capacity in TB | Storage System Port WWN | Storage System Port Speed | Connected Switch | Connected Fabric |
|---|---|---|---|---|---|---|
| Array D | SATA | 2 | 50:00:14:42:90:61:7e:00 | 8 | Switch 1 | Fabric 1 |
| | | | 50:00:14:42:90:61:7e:01 | 8 | Switch 2 | Fabric 1 |
| | | | 50:00:14:42:90:61:7e:02 | 8 | Switch 1 | Fabric 3 |
| | | | 50:00:14:42:90:61:7e:03 | 8 | Switch 2 | Fabric 3 |
| Array E | FC | 1 | 50:00:14:42:80:38:3c:28 | 8 | Switch 1 | Fabric 1 |
| | | | 50:00:14:42:80:38:3c:29 | 8 | Switch 2 | Fabric 1 |
| | | | 50:00:14:42:80:38:3c:30 | 8 | Switch 1 | Fabric 2 |
| | | | 50:00:14:42:80:38:3c:31 | 8 | Switch 2 | Fabric 2 |
| Array F | SATA | 1 | 50:00:14:42:80:61:7e:13 | 4 | Switch 1 | Fabric 1 |
| | | | 50:00:14:42:80:61:7e:14 | 4 | Switch 2 | Fabric 1 |
| | | | 50:00:14:42:80:61:7e:15 | 4 | Switch 1 | Fabric 2 |
| | | | 50:00:14:42:80:61:7e:16 | 4 | Switch 2 | Fabric 2 |

Subsequent to identification of network components in computing environment 100 along with their associated parameters, identification engine 124 may identify those network components, from all identified network components, whose state of associated parameters meet the desired states of SAN configuration parameters defined in the SLA for server 102. In an example, the identification may include a comparison between the desired states of SAN configuration parameters and the state of parameters associated with the network components in computing environment 100. Identification engine 120 may shortlist such network components. Referring to the earlier example in Table 2, identification engine 124 may, for example, shortlist network components shown in Table 4 that meet the desired states of SAN configuration parameters defined in the SLA for server 102.

TABLE 4

| Fabric | Switch | Switch Type | Ports Free | Port Speed | Aggregated Switch IOPs (Received + Transmitted) Mbytes/Sec |
|---|---|---|---|---|---|
| Fabric 1 | Switch 1 | Core | 35 | 8 | 1000 |
| | Switch 2 | Edge | 35 | 8 | 1000 |

TABLE 4-continued

| Fabric | Switch | Switch Type | Ports Free | Port Speed | Aggregated Switch IOPs (Received + Transmitted) Mbytes/Sec |
|---|---|---|---|---|---|
| Fabric 2 | Switch 1 | Core | 20 | 16 | 500 |
| | Switch 2 | Edge | 20 | 16 | 500 |
| Fabric 3 | Switch 1 | Core | 25 | 32 | 250 |
| | Switch 2 | Edge | 25 | 32 | 250 |

Likewise, subsequent to identification of storage components in computing environment 100 along with their associated parameters, identification engine 124 may identify those storage components, from all identified storage components, whose state of associated parameters meet the desired states of SAN configuration parameters defined in the SLA for server 102. In an example, the identification may include a comparison between the desired states of SAN configuration parameters and the state of parameters associated with the storage components in computing environment. Identification engine 124 may shortlist such storage components. Referring to the earlier example in Table 3, identification engine 124 may, for example, shortlist storage components shown in Table 5 that meet the desired states of SAN configuration parameters defined in the SLA for server 102.

TABLE 5

| Storage Array | Disk Type | Available Capacity in TB | Storage System Port WWN | Storage System Port Speed | Connected Switch | Connected Fabric |
|---|---|---|---|---|---|---|
| Array A | SSD | 2 | 20:01:00:02:ac:00:10:b5 | 24 | Switch 1 | Fabric 1 |
| | | | 20:01:00:02:ac:00:10:b6 | 24 | Switch 2 | Fabric 1 |
| | | | 20:01:00:02:ac:00:10:b7 | 24 | Switch 1 | Fabric 3 |

TABLE 5-continued

| Storage Array | Disk Type | Available Capacity in TB | Storage System Port WWN | Storage System Port Speed | Connected Switch | Connected Fabric |
|---|---|---|---|---|---|---|
| | | | 20:01:00:02:ac:00:10:b8 | 24 | Switch 2 | Fabric 3 |
| Array C | SSD | 1 | 50:00:09:75:f0:14:c9:c2 | 32 | Switch 1 | Fabric 1 |
| | | | 50:00:09:75:f0:14:c9:c3 | 32 | Switch 2 | Fabric 1 |
| | | | 50:00:09:75:f0:14:c9:c4 | 32 | Switch 1 | Fabric 2 |
| | | | 50:00:09:75:f0:14:c9:c5 | 32 | Switch 2 | Fabric 2 |

Subsequent to identification of network components whose state of associated parameters meet the desired states of SAN configuration parameters defined in the SLA, ranking engine 126 may rank the shortlisted network components based on a comparison between the state of associated parameters and the desired states of SAN configuration parameters for respective network components, relatively. Likewise, subsequent to identification of storage components whose state of associated parameters meet the desired states of SAN configuration parameters defined in the SLA, ranking engine may rank the shortlisted storage components based on a match between the state of associated parameters and the desired states of SAN configuration parameters for respective storage components, relatively.

Subsequent to identification of network components whose state of associated parameters meet the desired states of SAN configuration parameters defined in the SLA, ranking engine 126 may rank the shortlisted network components based on the respective states of a set of parameters associated with the shortlisted network devices. Examples of parameters that may be considered for ranking may include port speed, port availability, and aggregated switch IOPs. An example ranking of the shortlisted network components is given in Table 6 below.

TABLE 6

| Fabric Name | Switch Type | Ports Availability | Ports Speed | Aggregated Switch IOPs | Rank |
|---|---|---|---|---|---|
| Fabric 3 | Core | 50 | 32 | 250 | 1 |
| Fabric 2 | Core | 40 | 16 | 500 | 2 |
| Fabric 1 | Core | 70 | 8 | 1000 | 3 |

Likewise, subsequent to identification of storage components whose state of associated parameters meet the desired states of SAN configuration parameters defined in the SLA, ranking engine may rank the shortlisted storage components based on the respective states of a set of parameters associated with the shortlisted storage devices. Examples of parameters that may be considered for ranking may include a disk drive type, port speed, and available storage capacity. An example ranking of the shortlisted storage components is given in Table 7 below.

TABLE 7

| Storage System | Disk Drive Type | Controller Port Speed in Gbps | Available Capacity in TiB | Rank |
|---|---|---|---|---|
| Array C | SSD | 32 | 1 | 1 |
| Array A | SSD | 24 | 2 | 2 |

In an example, after network and storage components are individually ranked by ranking engine 126, indexer engine 128 may generate a combined ranking of ranked network and storage components based on a mapping between the state of parameter associated with a set of ranked components (for example, a network component and a storage component) and the desired state of a specific SAN configuration parameter defined in the SLA. Examples of the specific parameter may include available storage in a storage component, a number of free ports in a network component, port speed, a type of disk drive type, and aggregated switch IOPs.

Referring to the example described earlier, ranking engine 126 may provide the highest ranking to storage component "Array C" (Table 7) and network component "Fabric 3" (Table 6). However, when a specific parameter associated with a set of ranked components is mapped against the desired state of a specific SAN configuration parameter (for example, available storage), "Array A" may be given the highest rank since it offers more available storage. Therefore, indexer engine 128 may generate a more effective combined ranking for a set of network and storage components. Referring to the earlier example, "Array A" and "Fabric 3" together may be given the highest combined ranking by indexer engine if "available capacity" is considered. This is illustrated in Table 8 below.

TABLE 8

| Storage System | Fabric | Effective Ranking |
|---|---|---|
| Array A | Fabric 3 | 1 |
| Array C | Fabric 2 | 2 |

In an example, zoning engine 130 may create a SAN zone for server 102 based on the network and storage components identified by indexer engine 128. In an example, the highest ranked network and storage components based on the combined ranking generated by indexer engine 128 may be used for creating the SAN zone. In another example, zoning engine may create a SAN zone for server 102 based on the network and storage components identified by ranking engine 126. In an example, the highest ranked network and storage components based on the individual component ranking generated by ranking engine 126 may be used to create the SAN zone.

Figure 2:
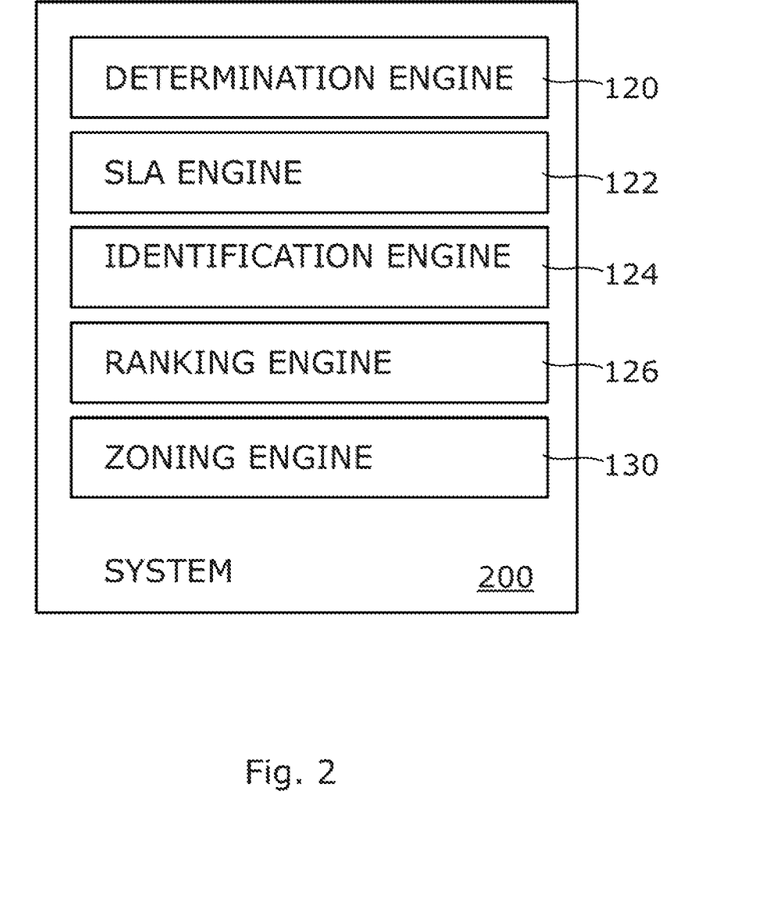
FIG. 2 is a block diagram of an example system for creating a storage area network (SAN) zone based on a service level agreement (SLA)

FIG. 2 is a block diagram of an example system 200 for creating a storage area network (SAN) zone based on a service level agreement (SLA). In an example, system 200 may be implemented by any suitable device, as described herein in relation to computing system 118 of FIG. 1, for example.

In an example, system 200 may include a determination engine 120, a Service Level Agreement (SLA) engine 122, an identification engine 124, a ranking engine 126, an indexer engine 128, and a zoning engine 130.

In an example, determination engine 120 may determine provisioning of a server in a cloud. Service Level Agreement (SLA) engine 122 may determine a SLA for the provisioned server. The SLA may define desired states of SAN configuration parameters to be met in configuring a SAN zone for the provisioned server. Identification engine 124 may identify components in the cloud for creating the SAN zone for the provisioned server. In an example, the identification of components may include identifying all network components and storage components present in the cloud by identification engine. From the identified components, identification engine 124 may identify network components and storage components that meet one of the desired states of SAN configuration parameters defined in the SLA for the provisioned server. Further, ranking engine 126 may rank the network components and the storage components that meet one of the desired states of SAN configuration parameters defined in the SLA based on a state a respective parameter associated with the network components and the storage components. Ranking engine 126 may then identify a highest ranked network component and a highest ranked storage component based on the ranking. Zoning engine 130 may create a SAN zone for the provisioned server based on the highest ranked network component and the highest ranked storage component.

Figure 3:
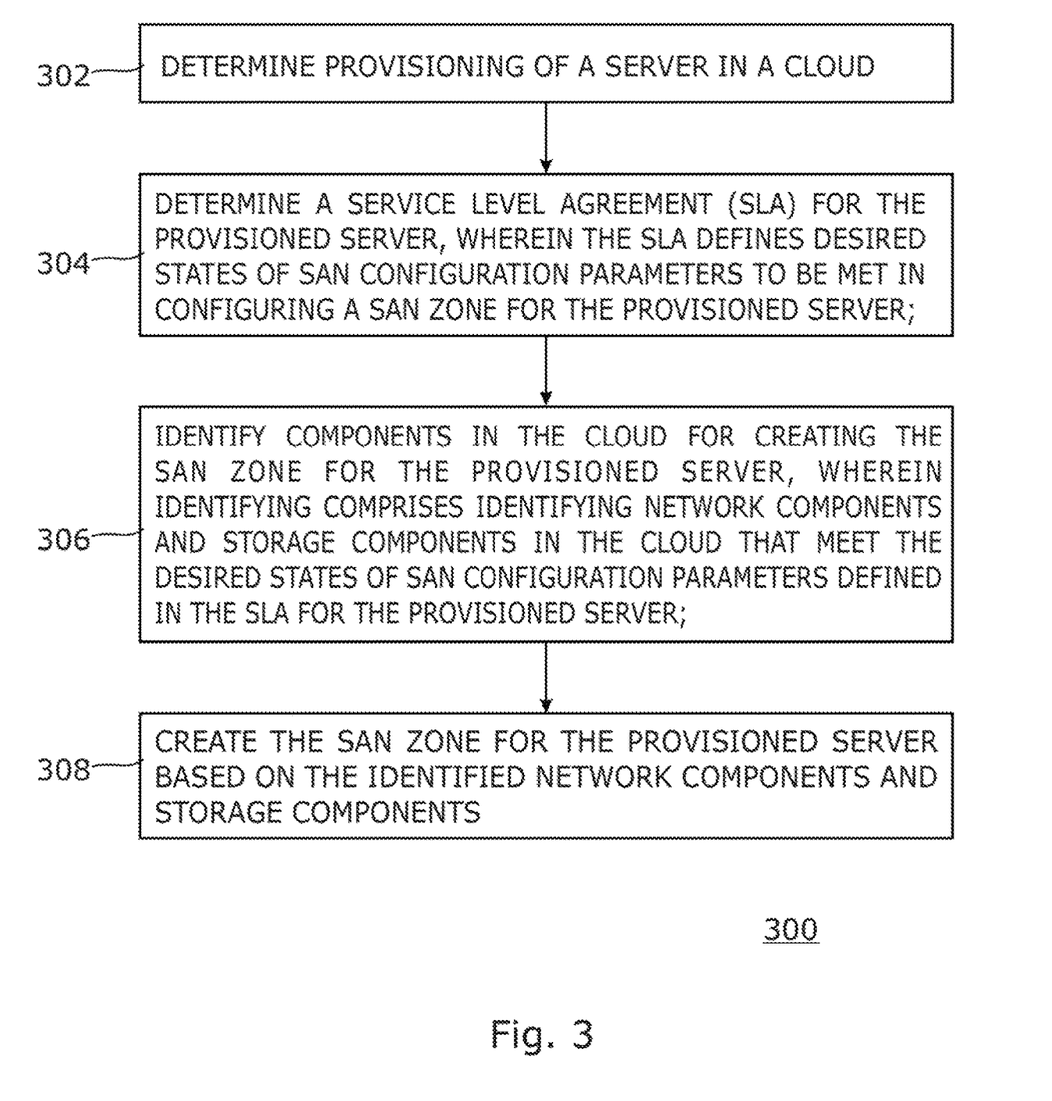
FIG. 3 is a block diagram of an example method of creating a storage area network (SAN) zone based on a service level agreement (SLA)

FIG. 3 is a block diagram of an example method 300 of creating a storage area network (SAN) zone based on a service level agreement (SLA). The method 300, which is described below, may be partially executed on a system such as computing system 118 of FIG. 1, or system 200 of FIG. 2. However, other suitable computing devices may execute method 300 as well. At block 302, provisioning of a server in a cloud may be determined. At block 304, a Service Level Agreement (SLA) for the provisioned server may be determined. The SLA may define desired states of SAN configuration parameters to be met in configuring a SAN zone for the provisioned server. At block 306, components may be identified in the cloud for creating a SAN zone for the provisioned server. In an example, the components may include network components and storage components in the cloud that meet the desired states of SAN configuration parameters defined in the SLA. At block 308, a SAN zone for the provisioned server may be created based on the identified network components and storage components.

Figure 4:
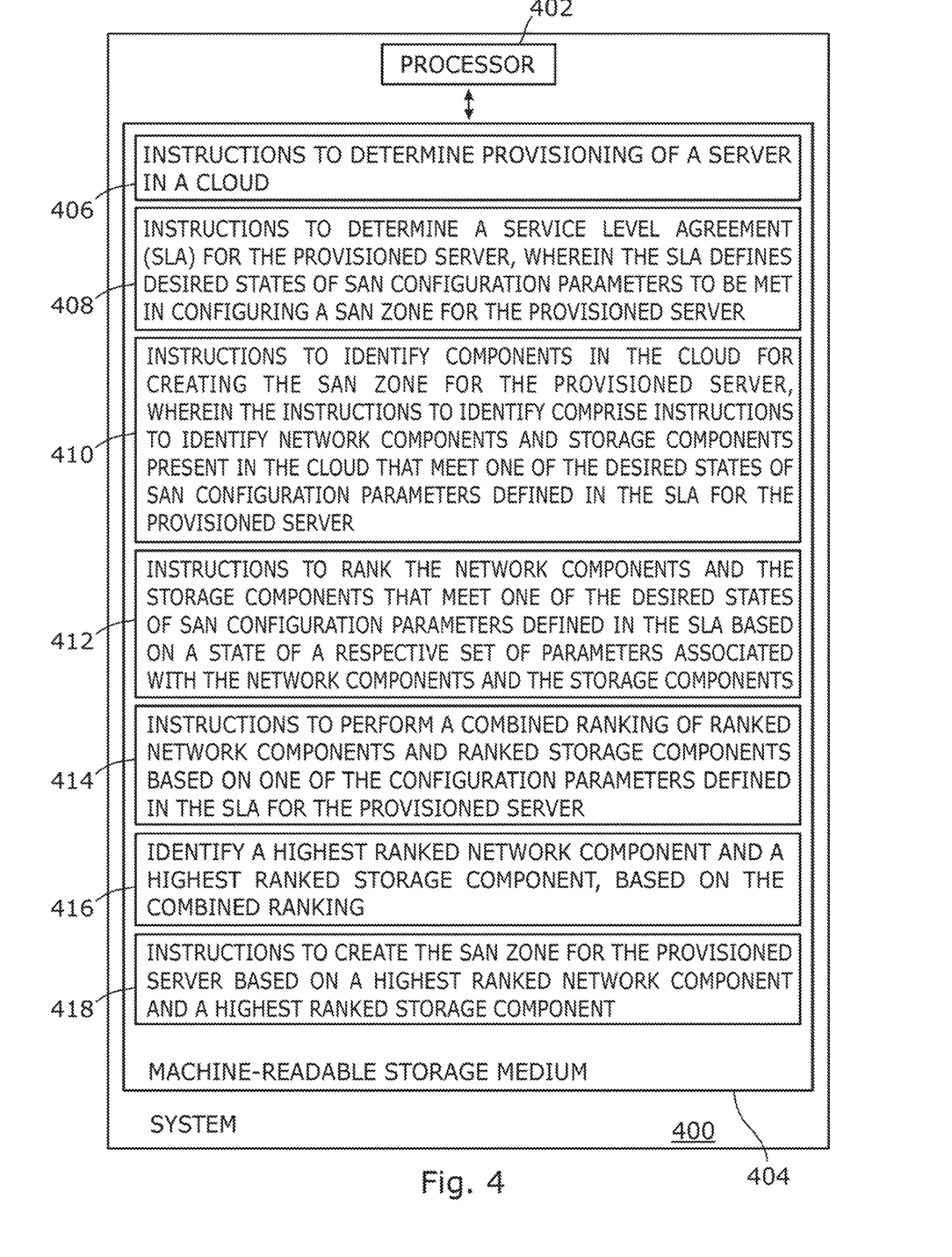
FIG. 4 is a block diagram of an example system including instructions in a machine-readable storage medium for creating a storage area network (SAN) zone based on a service level agreement (SLA).

FIG. 4 is a block diagram of an example system 400 including instructions in a machine-readable storage medium for creating a storage area network (SAN) zone based on a service level agreement (SLA). System 400 includes a processor 402 and a machine-readable storage medium 404 communicatively coupled through a system bus. In an example, system 400 may be analogous to network device 106 of FIG. 1, or network device 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium.

Machine-readable storage medium 404 may store instructions 406, 408, 410, 412, 414, 416, and 418. In an example, instructions 406 may be executed by processor 402 to determine provisioning of a server in a cloud. Instructions 408 may be executed by processor 402 to determine a Service Level Agreement (SLA) for the provisioned server. The SLA may define desired states of SAN configuration parameters to be met in configuring a SAN zone for the provisioned server. Instructions 410 may be executed by processor 402 to identify components in the cloud for creating the SAN zone for the provisioned server. In an example, the instructions to identify may comprise instructions to identify network components and storage components present in the cloud that meet one of the desired states of SAN configuration parameters defined in the SLA for the provisioned server. Instructions 412 may be executed by processor 402 to rank the network components and the storage components that meet one of the desired states of SAN configuration parameters defined in the SLA based on a state of a respective set of parameters associated with the network components and the storage components. Instructions 414 may be executed by processor 402 to generate a combined ranking of ranked network components and ranked storage components based on one of the configuration parameters defined in the SLA for the provisioned server. Instructions 416 may be executed by processor 402 to identify a highest ranked network component and a highest ranked storage component, based on the combined ranking. Instructions 418 may be executed by processor 402 to create a SAN zone for the provisioned server based on the highest ranked network component and the highest ranked storage component.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
by a processor:
determining provisioning of a server in a cloud;
determining a Service Level Agreement (SLA) for the provisioned server, wherein the SLA defines desired states of Storage Area Network (SAN) configuration parameters to be met in configuring a SAN zone for the provisioned server;
identifying components in the cloud for creating the SAN zone for the provisioned server, wherein identifying comprises identifying network components and storage components in the cloud that meet the desired states of SAN configuration parameters defined in the SLA for the provisioned server;
creating the SAN zone for the provisioned server based on the identified network components and storage components,
wherein identifying network components and storage components in the cloud that meet the desired states of SAN configuration parameters comprises:
identifying network components and storage components present in the cloud;
identifying, from the network components and the storage components present in the cloud, network components and storage components that meet one of the desired states of SAN configuration parameters defined in the SLA for the provisioned server;
ranking the network components and the storage components that meet one of the desired states of SAN configuration parameters defined in the SLA based on a state of a respective set of parameters associated with the network components and the storage components; and
identifying a highest ranked network component and a highest ranked storage component based on the ranking.

2. The method of claim 1, wherein creating the SAN zone comprises creating the SAN zone for the provisioned server based on the highest ranked network component and the highest ranked storage component.

3. The method of claim 1, further comprising
generating a combined ranking of ranked network components and ranked storage components based on one of the configuration parameters defined in the SLA for the provisioned server; and
identifying a highest ranked network component and a highest ranked storage component, based on the combined ranking.

4. The method of claim 3, wherein creating the SAN zone comprises creating the SAN zone for the provisioned server with the highest ranked network component and the highest ranked storage component, based on the combined ranking.

5. A system comprising:
a machine-readable storage medium including instructions; and
at least one processor to execute the instructions to:
determine provisioning of a server in a cloud;
determine a SLA for the provisioned server, wherein the SLA defines desired states of Storage Area Network (SAN) configuration parameters to be met in configuring a SAN zone for the provisioned server;
identify components in the cloud for creating the SAN zone for the provisioned server,
wherein the identification comprises to: identify network components and storage components present in the cloud; and identify, from the network components and the storage components present in the cloud, network components and storage components that meet one of the desired states of SAN configuration parameters defined in the SLA for the provisioned server;
rank the network components and the storage components that meet one of the desired states of SAN configuration parameters defined in the SLA based on a state a respective parameter associated with the network components and the storage components;
identify a highest ranked network component and a highest ranked storage component based on the ranking; and
create the SAN zone for the provisioned server based on the highest ranked network component and the highest ranked storage component.

6. The system of claim 5, wherein the network components that meet one of the desired states of SAN configuration parameters defined in the SLA includes a network component with a parameter whose state meets one of the desired states of SAN configuration parameters defined in the SLA.

7. The system of claim 6, wherein the parameter includes one of a networking switching device, a type of networking switching device, a number of free ports on a networking switching device, port speed on a networking switching device, aggregated switch input/output operations per second (IOPs).

8. The system of claim 5, wherein the storage components that meet one of the desired states of SAN configuration parameters defined in the SLA includes a storage component with a parameter whose state meets one of the desired states of SAN configuration parameters defined in the SLA.

9. The system of claim 8, wherein the parameter includes one a disk drive type, available storage capacity in a storage component, storage array port WWN, storage component input/output operations per second (IOPs), port speed on a storage component, a network fabric coupled to a storage component, and a network switching device coupled to a storage component.

10. A non-transitory machine-readable storage medium comprising instructions, the instructions executable by a processor to:
determine provisioning of a server in a cloud;
determine a Service Level Agreement (SLA) for the provisioned server, wherein the SLA defines desired states of Storage Area Network (SAN) configuration parameters to be met in configuring a SAN zone for the provisioned server;

identify components in the cloud for creating the SAN zone for the provisioned server, wherein the instructions to identify comprise instructions to identify network components and storage components present in the cloud that meet one of the desired states of SAN configuration parameters defined in the SLA for the provisioned server;

rank the network components and the storage components that meet one of the desired states of SAN configuration parameters defined in the SLA based on a state of a respective set of parameters associated with the network components and the storage components;

generate a combined ranking of ranked network components and ranked storage components based on one of the configuration parameters defined in the SLA for the provisioned server;

identify a highest ranked network component and a highest ranked storage component, based on the combined ranking; and create the SAN zone for the provisioned server based on the highest ranked network component and the highest ranked storage component.

11. The storage medium of claim 10, wherein the provisioning includes coupling the server to a network fabric in the cloud.

12. The storage medium of claim 10, wherein the server is provisioned via a cloud platform.

13. The storage medium of claim 10, wherein the SAN configuration parameters include at least one of a disk drive type, available storage capacity in a storage component, storage array port World Wide Name (WWN), storage component input/output operations per second (IOPs), port speed on a storage component, a network fabric coupled to a storage component, a network switching device coupled to a storage component, and a number of available paths to a storage component.

14. The storage medium of claim 1, wherein instructions to create the SAN zone for the provisioned server includes instructions to perform one of hard zoning and soft zoning in relation to the provisioned server.

* * * * *